(12) United States Patent
Binek et al.

(10) Patent No.: US 11,753,994 B2
(45) Date of Patent: Sep. 12, 2023

(54) FUEL FEED PASSAGES FOR AN ATTRITABLE ENGINE

(71) Applicant: Raytheon Technologies Corporation, Farmington, CT (US)

(72) Inventors: Lawrence A. Binek, Glastonbury, CT (US); David W. Morganson, Marlborough, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 17/962,059

(22) Filed: Oct. 7, 2022

(65) Prior Publication Data
US 2023/0041714 A1 Feb. 9, 2023

Related U.S. Application Data

(62) Division of application No. 16/448,801, filed on Jun. 21, 2019, now Pat. No. 11,465,247.

(51) Int. Cl.
*F28F 9/02* (2006.01)
*F28D 21/00* (2006.01)
*F02C 7/22* (2006.01)
*B23P 15/26* (2006.01)
*B33Y 80/00* (2015.01)

(52) U.S. Cl.
CPC .............. *F02C 7/222* (2013.01); *B23P 15/26* (2013.01); *F28F 9/0265* (2013.01); *B33Y 80/00* (2014.12); *F28D 2021/0021* (2013.01); *F28D 2021/0026* (2013.01)

(58) Field of Classification Search
CPC ........ B23P 15/26; F28F 9/0265; B33Y 80/00; F28D 2021/0021; F28D 2021/0026
See application file for complete search history.

(56) References Cited

U.S. PATENT DOCUMENTS

| | | | | |
|---|---|---|---|---|
| 5,226,311 A | * | 7/1993 | Scourtes | G05D 7/0676 73/114.42 |
| 5,257,496 A | * | 11/1993 | Brown | F23N 5/082 60/773 |
| 5,727,378 A | * | 3/1998 | Seymour | F01D 25/125 60/738 |

* cited by examiner

Primary Examiner — Lawrence Averick
(74) Attorney, Agent, or Firm — Getz Balich LLC

(57) ABSTRACT

An additively manufactured attritable engine includes a compressor section, a combustion section, a turbine section, and an engine case wall, which surrounds the compressor section, the combustion section, and the turbine section. The engine case wall includes a first cavity embedded in the engine case wall that defines an injector that is in fluid communication with the combustion section. The engine case wall includes a second cavity embedded within the engine case wall and defines a fuel feed passage that is in thermal communication through the exterior surface of the engine case wall.

10 Claims, 3 Drawing Sheets

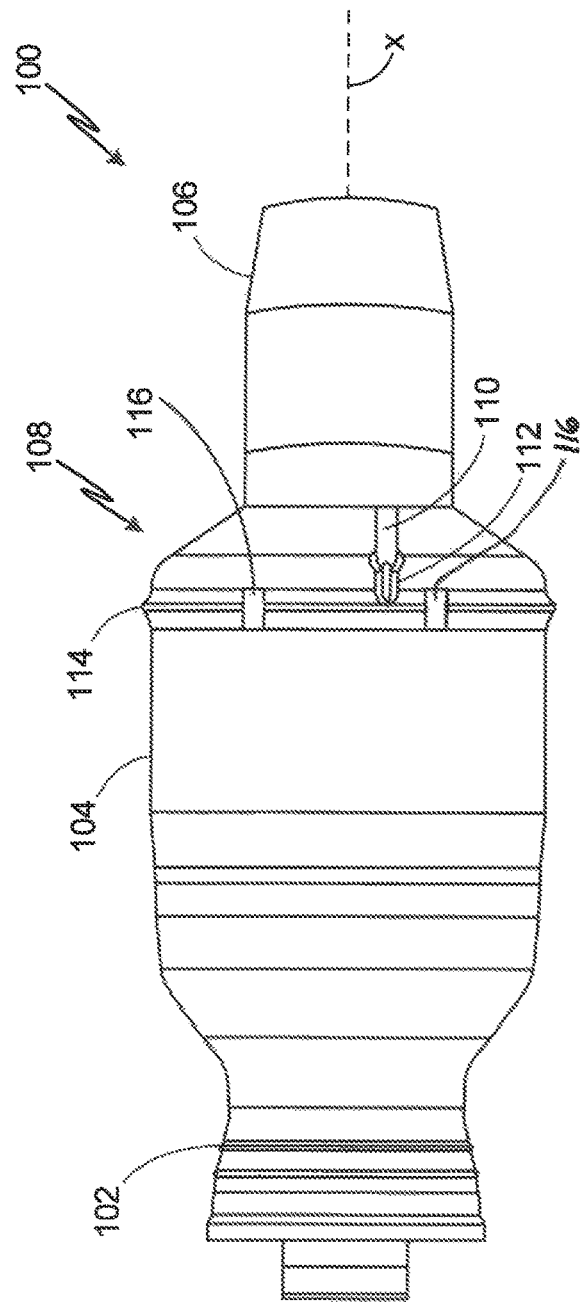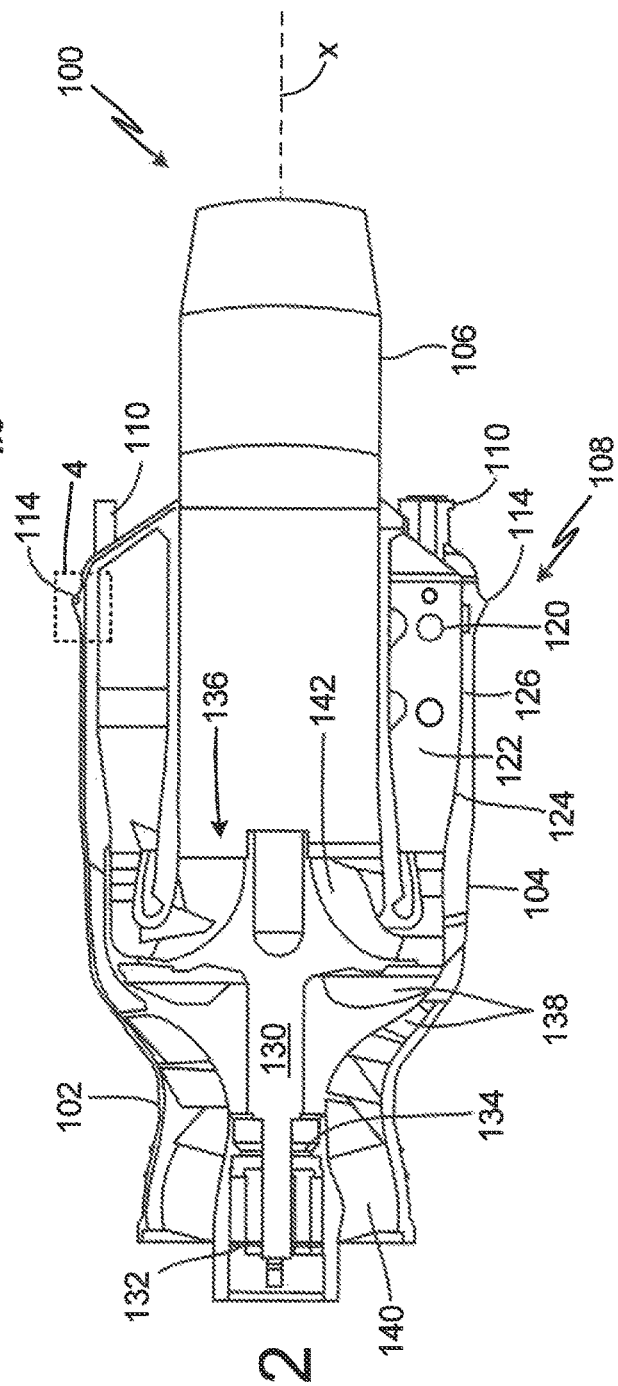

FUEL FEED PASSAGES FOR AN ATTRITABLE ENGINE

This application is a divisional of U.S. patent application Ser. No. 16/448,801 filed Jun. 21, 2019, which is hereby incorporated herein by reference in its entirety.

BACKGROUND

The present disclosure relates generally to attritable aircraft engines. More specifically, this disclosure relates to cooling a fluid dispensing system within an attritable aircraft engine.

Attritable aircraft can include, for example, Unpiloted (or Unmanned) Aerial Vehicles (UAVs) and expendable turbojet systems for guided munitions, missiles, and decoys. Attritable aircraft are generally designed as a limited lifetime vehicle, which can be as short as a single use or single mission vehicle. As such, many components and features common in traditional piloted aircraft are unnecessary, such as, a fuel dispensing system within a traditional aircraft engine, which can have more than 30 individual parts, each requiring assembly. Even in the realm of attritable engines, conventional fuel rails can have more than 10 individual parts, which need to be brazed together, which is expensive and time consuming.

Furthermore, conventional fluid dispensing devices may be heavy, are difficult to package, and because of the many operating parts may be expensive to maintain and/or repair. There exist needs in various industries to reduce the number of manufactured parts for fluid dispensing devices, thereby providing more robust and simpler designs, which requires less maintenance, reduces manufacturing time and costs, reduces weight, and simplifies packaging.

SUMMARY

An additively manufactured attritable engine includes a compressor section, a combustion section, a turbine section, and an engine case wall, which surrounds the compressor section, the combustion section, and the turbine section. The engine case wall includes a first cavity embedded in the engine case wall that defines an injector that is in fluid communication with the combustion section. The engine case wall includes a second cavity embedded within the engine case wall and defines a fuel feed passage that is in thermal communication through the exterior surface of the engine case wall.

A method of testing a fluid dispensing system in an attritable engine that has a fuel line and an N number of fuel feed passages includes applying cooling to an exterior surface adjacent to each fuel feed passage for each of (N−1) injectors and inducing a phase change to a flow test fluid in each of (N−1) fuel feed passages, which prevents flow through each of (N−1) injectors. The method includes measuring a flow rate of the flow test fluid through a single unblocked injector.

BRIEF DESCRIPTION OF THE DRAWINGS

FIG. 1 is a side view of an attritable engine.
FIG. 2 is a cross-sectional view of the attritable engine.

DETAILED DESCRIPTION

Figure 3:
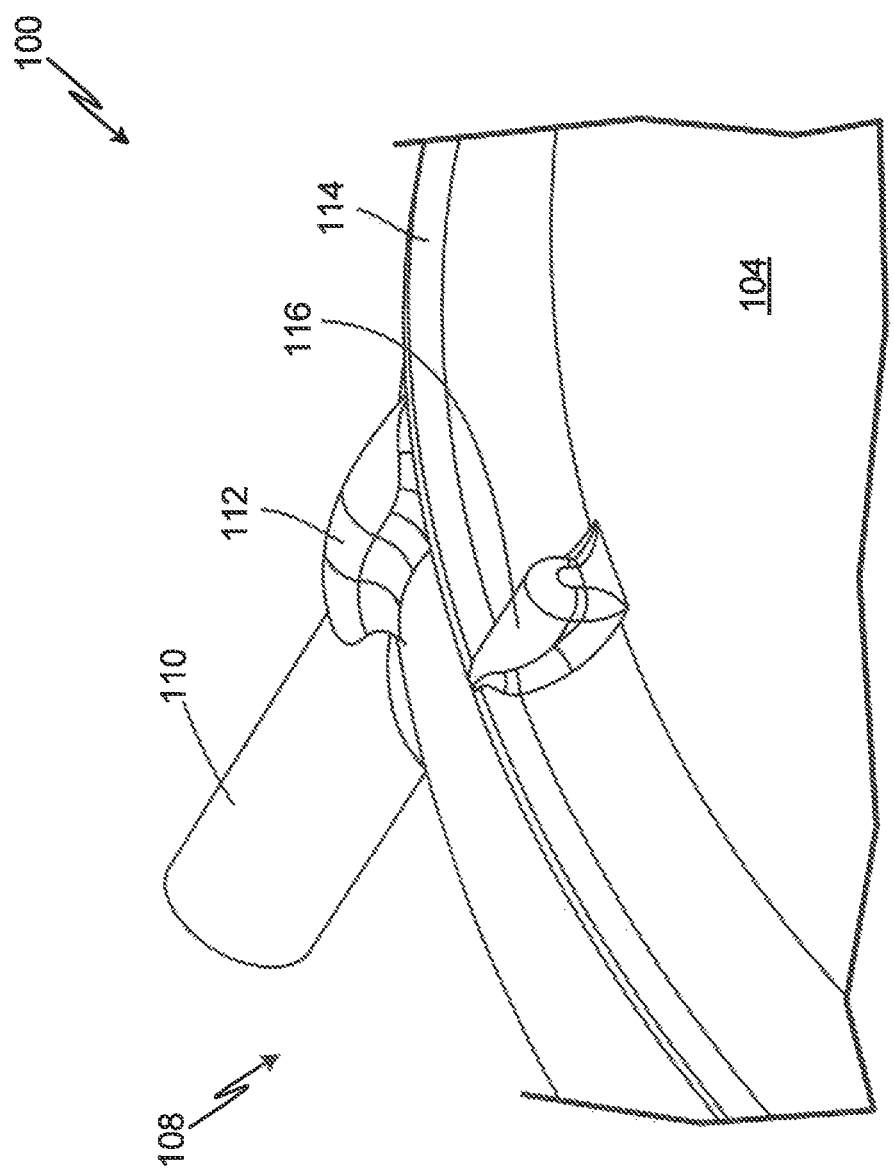
FIG. 3 is a perspective view of the attritable engine with a fuel feed passage.

An attritable engine with an integrally built fuel dispensing system simplifies manufacturing. Even so, an attritable engine can leverage additive manufacturing techniques to improve various aspects of the limited-life engine. For example, additive manufacturing allows the assembly details to be unitized and, simultaneously permits integration of many complex performance-enhancing features. The additively manufactured engine reduces the time to delivery to the customer and lowers the overall production costs of the unit.

However, an integrally built fuel system in an attritable engine limits accessibility for inspection and testing post-manufacture. Typically, gas turbine engines have more than one fuel injector per engine, which complicates determining whether one or more individual injectors are clogged or otherwise faulty using routine techniques. For example, although CT scanning (Computed Tomography) can be used to inspect an attritable engine, CT scanning is very time consuming and costly. As such, CT scanning is not amenable to inspection of every manufactured attritable engine. An attritable engine with fuel feed passages and a method to individually isolate and flow test each injector using the fuel feed passages are disclosed herein.

FIGS. 1 and 2 will be discussed together. FIG. 1 is a side view of an attritable engine. FIG. 1 shows attritable engine 100 including forward engine casing 102, rearward engine casing 104, exhaust casing 106, fluid distribution system 108, fuel inlet 110, fuel manifold 112, fuel line 114, fuel feed passages 116, and axis of rotation X. FIG. 2 is a cross-sectional view of attritable engine 100 including forward engine casing 102, rearward engine casing 104, exhaust casing 106, fluid distribution system 108, fuel inlet 110, fuel line 114, combustor 122, combustor liner 124, air channel 126, rotor 130, bearings 132 and 134, rotor system 136, compressor blades 138, air inlet 140, turbine blades 142, and axis of rotation X.

Forward engine casing 102 encases a compressor section of attritable engine 100 and is connected to rearward engine casing 104, which encases combustion and turbine sections of attritable engine 100. Exhaust casing 106 is connected to rearward engine casing 104, opposing forward engine casing 102.

Rearward engine casing 110 has fluid distribution system 108 including fuel inlet 110, fuel manifold 112, fuel line 114, and fuel feed passage 116. Although only two feed passages 116 are shown, four other feed passages are present and circumferentially related around axis of rotation X and obscured in FIG. 1 by rearward engine casing 104.

Fuel inlet 110 is coupled to a fuel source such as a fuel tank. Fuel inlet 110 is configured to deliver fuel to fuel manifold 112, which is connected to and delivers fuel to fuel line 114. The fuel exits fuel line 114 and enters fuel feed passage 116. The fuel exits fuel feed passage 116 and enters injector 120, which delivers the fuel to combustor 122 defined by combustor wall 124. The fuel can be aerated by air from air channel 126 prior to delivery into combustor 122, aerated in combustor 122, or aerated both prior to and during delivery to combustor 122.

Combusted fuel exits combustor 122 and turns rotor 130, which is received in bearings 132 and 134. Rotor system 136 includes compressor blades 138, air inlet 140, and turbine blades 142. Air enters air inlet 140 and is compressed by compressor blades 138. Compressed air enters combustor 122 where the compressed air is combusted with fuel from injector 120. The combusted air from combustor 122 enters and turns turbine blades 142, which are attached to rotor 130, circumferentially around rotational axis X, generating power. The air exits out of exhaust casing 106.

Figure 4:
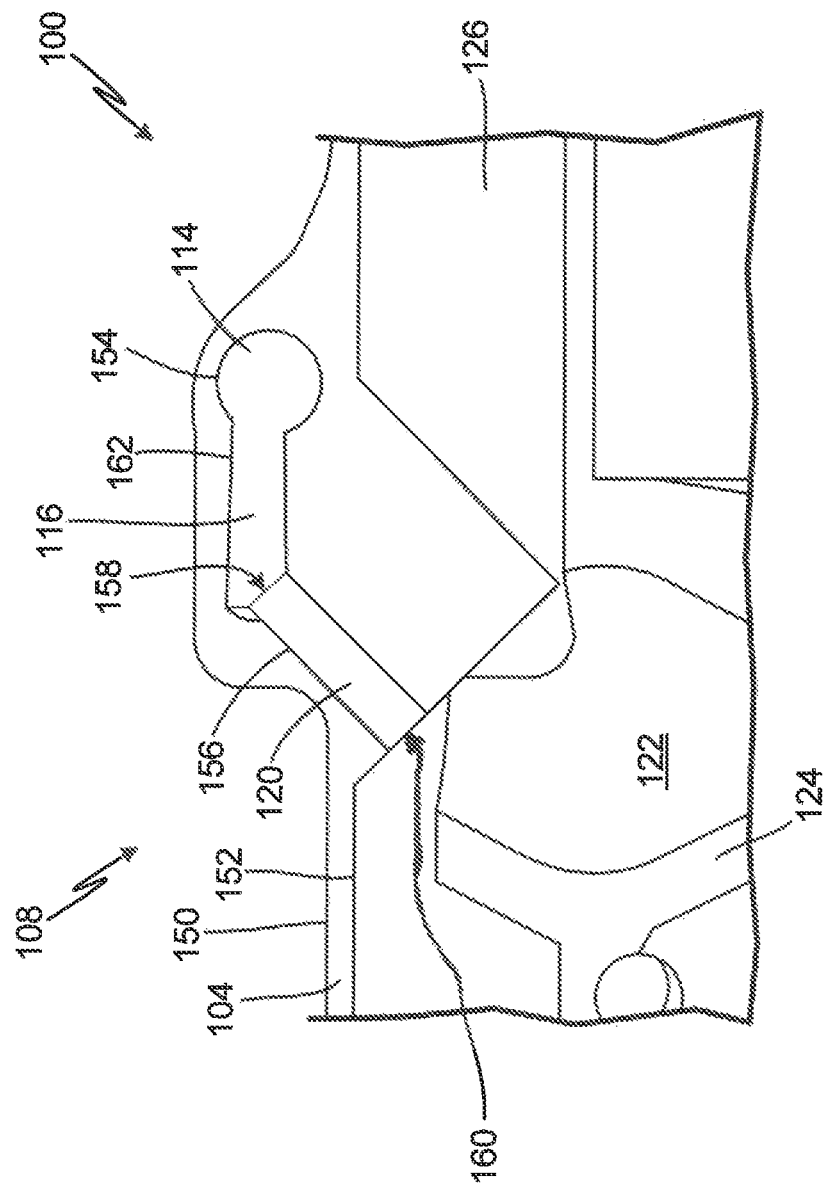
FIG. 4 is a sectional region view of an injector with a fuel feed passage shown in FIG. 2.

FIGS. 3 and 4 will be discussed together. FIG. 3 is a perspective view of the attritable engine with a fuel feed passage. FIG. 3 shows attritable engine 100 including rearward engine casing 104, fluid dispensing system 108, fuel inlet 110, fuel manifold 112, fuel line 114, and fuel feed passage 116. FIG. 4 is a sectional region view of an injector with a fuel feed passage shown in FIG. 2. FIG. 4 shows attritable engine 100 including rearward engine casing 104, fluid dispensing system 108, fuel line 114, fuel feed passage 116, injector 120, combustor 122, combustor wall 124, air channel 126, exterior surface 150, interior surface 152, fuel line wall 154, injector wall 156, injector inlet 158, injector outlet 160, and fuel feed passage wall 162.

Attritable engine 100 includes rearward engine casing 104, which has exterior surface 150 and interior surface 152. Attritable engine 100 also includes fluid dispensing system 108 manufactured integral and conformal with rearward engine casing 104. Fluid dispensing system 108 includes fuel inlet 110, fuel manifold 112, fuel line 114, injector 120, injector inlet 158, injector outlet 160, and fuel feed passage 116. Rearward engine casing 104 includes a plurality of cavities. Fuel line 114 is a cavity within rearward engine casing 104 defined by fuel line wall 154. Injector 120 is a cavity within rearward engine casing 104 and is defined by injector wall 156. Fuel feed passage 116 is a cavity within rearward engine casing 104 and is defined by fuel feed passage wall 162.

Rearward engine casing 104 circumferentially surrounds rotor 130 along its rotational axis X. Injector 120 is attached to fuel feed passage 116 at injector inlet 158. Injector 120 extends at an acute angle from rearward engine casing 104 in an axial direction toward rotor 130's rotational axis X and away from exterior surface 150. Injector 120 is integral and conformal with rearward engine casing 104 and extends through and is defined by rearward engine casing 104.

Fluid distribution system 108 operates by fuel entering fuel inlet 110, which is configured to receive fuel from a fuel source such as a fuel tank and deliver fuel to fuel manifold 112. The fuel enters fuel line 114 from fuel manifold 112 and is delivered to fuel feed passage 116, which delivers the fuel to injector 120 at injector inlet 158. The fuel can be partially aerated in fuel line 114. For example, fuel line 114 can have numerous holes where air from air channel 126 may enter and mix with the fuel. The fuel travels through injector 120 and exits at injector outlet 160 where the fuel is dispensed into combustor 122. Injector outlet 160 of injector 120 is configured to deliver fuel, which can be aerated, to combustor 122. The fuel entering combustor 122 can be further aerated and is combusted.

Fuel feed passages 116 are built integral and conformal with rearward engine casing 104. In one embodiment, fuel feed passages 116 extend laterally with exterior surface 150 and are substantially parallel with exterior surface 150. Alternatively, fuel feed passages 116 can extend at an acute angle from exterior surface 150 toward axis of rotation X of rotor 130.

Fuel feed passages 116 are in thermal communication with exterior surface 150. Fuel feed passages 116 are close enough to exterior surface 150 to be in thermal communication with exterior surface 150, but not close enough to reduce the structural integrity of rearward engine casing 104, injector 120, or fuel feed passages 116 compared to an attritable engine without any fuel feed passages. In other words, fuel feed passages 116 have sufficient structural integrity to withstand the pressures and temperatures in an attritable engine under load.

An attritable engine can have more than one injector per engine. After the attritable engine has been manufactured, the injectors can be flow tested to ensure the stringent flow requirements are met to operate the gas turbine engine under load. However, it is desirable to flow test each injector one at a time and, as such, desirable to temporarily block the flow of the other injectors present in the attritable engine.

The fuel feed passage system of attritable engine 100 temporarily blocks the flow to the other injectors in the attritable engine by freezing a flow test fluid in each of the other fuel feed passages. A flow test fluid is injected into fuel line 114 and enters fuel feed passage 116. Cooling is then applied to exterior surface 150 adjacent to fuel feed passage 116. The applied cooling can be in the form of a solid, liquid, or a gas such as, for example, ice, water, salt water, a water-alcohol mixture, carbon dioxide gas, or nitrogen gas. As cooling is applied heat is absorbed from rearward engine casing 104, which in turn absorbs heat from a flow test fluid present in fuel feed passage 116. The applied cooling is cold enough to induce a phase change in the testing fluid to a solid. The solid testing fluid prevents any further flow through injector 120.

Cooling is applied to fuel feed passages 116 for all the injectors of attritable engine 100, except for one. For example, an attritable engine with an N number of injectors would have (N−1) fuel feed passages cooled, which prevents flow through the corresponding (N−1) injectors. That leaves one injector available for flow testing. The flow rate can be measured of a test fluid such as, for example, water or fuel. The injector under test can be blocked by cooling exterior surface 150 adjacent to fuel feed passage 116 in order to induce a phase change in the flow test fluid present in the fuel feed passage. Next, one of the (N−1) injectors can be unblocked by allowing the flow test fluid to undergo another phase change. Either heating can be applied to the exterior surface 150 adjacent to fuel feed passage 116 or ambient conditions can be allowed to warm up the flow test fluid by simply removing the cooling from exterior surface 150 adjacent to fuel feed passage 116. Subsequently, the one of the (N−1) injectors can be flow tested. This process can be repeated until all N injectors have been fluidically isolated and flow tested.

Notably, water can be used both as the cooling fluid and the flow test fluid. For example, fast moving water, a suitable mixture of salt water, or a suitable mixture of water and alcohol do not freeze even below 0° C. (32° F.) and, as such, can induce a phase change of water in the fuel feed passage.

Measured flow rates within tolerance requirements indicate a successful manufacture, whereas, measured flow rates outside of tolerance requirements may indicate the injector was not manufactured correctly. For example, a metallic powder used during an additive manufacturing process may not be sintered completely or properly removed after one or more additive manufacturing building steps and, as such, obstruct the flow path through the injector.

Alternatively, a gas, such as Argon, can be used as the flow test fluid. A gas passing through a restricted opening, such as an injector, induces an acoustic vibration. The pitch of the acoustic vibration changes as the restriction is enlarged or narrowed. Measuring the pitch of the acoustic vibration may indicate a successful build, an improper build, or a plugged injector.

Attritable engine 100 is built using additive manufacturing techniques and has fluid dispensing system 108 manufactured integral with the engine case wall. Specifically, the engine case wall is built up in a layer-by-layer process in an axial direction toward the central rotor's rotational axis and has a plurality of cavities. The additively manufactured engine case wall results in a geometry for the injector that meets the stringent tolerance requirements of the attritable engine and includes cooling holes to allow sequential flow testing of individual injectors within the attritable engine.

Attritable engine 100 can be additively manufactured using any metal or alloy that can tolerate the high temperature and pressure environment of an aircraft combustion engine for the expected useable life of the vehicle, such as, for example, Inconel® 625 or other nickel alloys or alloys of nickel, chromium, and iron. However, guided munitions, missiles, and decoys are designed as single use vehicles and can have a maximum useable life of 10 hours. Heat protection that extends the useable life of the vehicle beyond 10 hours can unnecessarily add labor and expense to the manufacturing of such an engine. On the other hand, some UAVs can be designed to perform multiple missions and more heat protection may be desirable. A specific metal or alloy with or without additional treatments to provide heat protection can be chosen with such considerations in mind. For example, a thermal barrier layer or coating can be applied to the metal or alloy to extend the useful life of the attritable engine.

Providing fuel feed passages adjacent to and in thermal communication with the exterior surface of an attritable engine allows each injector to be fluidically isolated and flow tested after the attritable engine has been manufactured. This testing process is much faster and less expensive than conventional testing techniques such as CT scanning.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of testing a fluid dispensing system in an engine that includes a fuel line and an N number of injectors, the method comprising:
   applying cooling to an exterior surface adjacent each fuel feed passage for each of (N−1) injectors;
   inducing a phase change to a flow test fluid in each of (N−1) fuel feed passages, preventing flow through each of (N−1) injectors; and
   measuring a flow rate of the flow test fluid through a single unblocked injector.

2. The method of claim 1, further comprising:
   applying cooling to an exterior surface adjacent the single unblocked injector;
   inducing a phase change to a flow test fluid in the fuel feed passage in fluid communication with the single unblocked injector, preventing flow through the single unblocked injector;
   inducing a phase change to a flow test fluid in one of the (N−1) fuel feed passages, allowing flow through one of the (N−1) injectors; and
   measuring a flow rate of the flow test fluid through one of the (N−1) injectors.

3. The method of claim 1, wherein
   the engine includes a compressor section, a combustion section, a turbine section and an engine case wall surrounding the compressor section, the combustion section and the turbine section;
   the engine case wall extends radially between an interior surface of the engine case wall and the exterior surface; and
   the injectors and the fuel feed passages are formed by and embedded within material of the engine case wall.

4. The method of claim 3, wherein the fuel line is formed by and embedded within the material of the engine case wall.

5. The method of claim 4, wherein the fuel line extends circumferentially around the engine case wall.

6. The method of claim 3, wherein the engine case wall comprises a nickel alloy.

7. The method of claim 3, wherein
   the combustor section includes a combustor and a combustor wall forming a radial outer boundary of the combustor; and
   the engine case wall is separated from the combustor wall by an air channel.

8. The method of claim 1, wherein the fuel feed passages are parallel to the exterior surface.

9. The method of claim 1, wherein
   the engine includes a combustor section and an engine case wall housing the combustor section;
   the engine case wall comprises the fuel line, the fuel feed passages and the injectors;
   the fuel line extends circumferentially about an axis within material of the engine case wall;
   the fuel feed passages extend axially within the material of the engine case wall; and
   the injectors extend within the material of the engine case wall.

10. A testing method, comprising:
    providing a structure of an engine, the structure including a fuel line, a first injector, a second injector, a first fuel feed passage and a second fuel feed passage, the first fuel feed passage extending from the fuel line to the first injector, and the second fuel feed passage extending from the fuel line to the second injector;
    disposing a flow test fluid in the first fuel feed passage;
    cooling an exterior surface of the structure adjacent the first fuel feed passage to induce a phase change in the flow test fluid in the first fuel feed passage and thereby block fluid flow through the first injector, wherein the second injector remains unblocked; and
    measuring a flow rate of the flow test fluid through the second injector.

* * * * *